United States Patent [19]
Hendrix

[11] Patent Number: 5,912,916
[45] Date of Patent: Jun. 15, 1999

[54] ELECTRIC FURNACE WITH INSULATED ELECTRODES AND PROCESS FOR PRODUCING MOLTEN METALS

[75] Inventor: Charles F. Hendrix, Pell City, Ala.

[73] Assignee: Alabama Power Company, Birmingham, Ala.

[21] Appl. No.: 08/982,455

[22] Filed: Dec. 2, 1997

Related U.S. Application Data

[63] Continuation-in-part of application No. 08/774,210, Dec. 27, 1996, which is a continuation-in-part of application No. 08/431,845, May 1, 1995, Pat. No. 5,588,982.

[51] Int. Cl.$^6$ .................................................. H05B 7/10
[52] U.S. Cl. .................................. 373/94; 373/92; 373/93
[58] Field of Search ................................ 373/92, 91, 93, 373/81; 75/509, 10.5

[56] References Cited

U.S. PATENT DOCUMENTS

| | | | |
|---|---|---|---|
| 2,242,219 | 5/1941 | Baily | 420/29 |
| 3,768,997 | 10/1973 | Bliss et al. | 75/10.5 |
| 3,777,040 | 12/1973 | Gell et al. | 373/37 |
| 3,896,257 | 7/1975 | Kinoshita | 13/33 |
| 3,985,545 | 10/1976 | Kinoshita | 75/12 |
| 4,189,617 | 2/1980 | Schwabe et al. | 373/91 |
| 4,287,381 | 9/1981 | Montgomery | 373/92 |
| 4,442,525 | 4/1984 | Zolner et al. | 373/93 |
| 4,456,476 | 6/1984 | Sherwood | 75/509 |
| 4,468,783 | 8/1984 | Bauer et al. | 373/93 |
| 4,491,472 | 1/1985 | Stevenson et al. | 75/10 R |
| 4,530,853 | 7/1985 | Lewallen et al. | 427/113 |

(List continued on next page.)

OTHER PUBLICATIONS

"CONTIARC, A New Scrap Melting Technology", Hofmann et al., Second Int'l Symposium on Metallurgical Processes for the Year 2000 and Beyond, San Diego, Sep. 1994.
"Electric–Furnace Ironmaking in Venezuela", Journal of Metals, Sep. 1963.
"New Zealand Steel: A Decade of Progress", Metal Bulletin Monthly, Mar. 1980.
"Direct Reduction at New Zealand's Glenbrook Works", Evans, Steel Times International, Dec. 1986.
"Refining Liquid Pig Iron in Electric Arc Furnaces", Durrer et al., Journal of the Iron Steel Institute, May 1959.
"Arc Furnace Iron Competes", Steel, p. 40.
"Electric Ironmaking Furnaces, A Competetitor to the Blast Furnace?", Astier, Journal of Metals, Sep. 1963.
"Prospects Brighten for NZ Steel", MBM, Nov. 1989.
"Innovative Ironmaking at New Zealand Steel", Crawford, Ironmaking, 1982.
Paper Entitled "Iron Making".
"Reclamation of Iron and Steelmaking Dusts, Sludges and Scales Using the INMETCO Technology", Lehmkuhler et al., INMETCO, Ellwood City, PA, USA.
"Generation and Utilization of Heat in a Slag Resistance Electric Furnace", Themelis, Columbia University, Aug. 1988.
"Reclaiming Metal Values from Spent Pickling Wastes", Hanewald et al., INMETCO, Ellwood City, PA, Oct. 18–20, 1993.

*Primary Examiner*—Teresa Walberg
*Assistant Examiner*—Quang Van
*Attorney, Agent, or Firm*—Roylance, Abrams, Berdo & Goodman, L.L.P.

[57] ABSTRACT

An electric arc furnace having a partially insulated electrode produces molten metal such as foundry iron from an iron source where little or no slag is produced. The furnace includes at least one insulated electrode assembly for immersing deep into the metal charge. The electrode assembly has an electrically conducting member coupled to an electrode. The electrode has a coupling member at the upper end for coupling with the electrically conducting member and a coupling member at the lower end for coupling with an adjacent electrode to form an electrode column. The coupling members can be an internally threaded recess in the ends thereof. An externally threaded coupling member can be threaded into the recesses of the electrodes for coupling two or more electrodes together.

47 Claims, 2 Drawing Sheets

U.S. PATENT DOCUMENTS

| | | | |
|---|---|---|---|
| 4,613,363 | 9/1986 | Wienert | 75/10.62 |
| 4,731,112 | 3/1988 | Hoffman | 75/10.22 |
| 4,772,514 | 9/1988 | Neufuss et al. | 428/408 |
| 4,995,051 | 2/1991 | Hakulin et al. | 373/81 |
| 5,125,002 | 6/1992 | Steitz et al. | 373/37 |
| 5,588,982 | 12/1996 | Hendrix | 75/10.5 |
| 5,654,976 | 8/1997 | Cowx et al. | 373/79 |

ELECTRIC FURNACE WITH INSULATED ELECTRODES AND PROCESS FOR PRODUCING MOLTEN METALS

CROSS-REFERENCE TO RELATED APPLICATIONS

This application is a continuation-in-part application of Ser. No. 08/774,210 filed Dec. 27, 1996 in the name of Charles F. Hendrix and entitled "A Submerged Arc Furnace With an Insulated Electrode and Process for Producing Foundry Iron", which is a continuation-in-part of Ser. No. 08/431,845, filed on May 1, 1995 in the name of Charles F. Hendrix and entitled "Process for Producing Foundry Iron", now U.S. Pat. No. 5,588,982, the subject matter of each of which is hereby incorporated by reference in its entirety.

FIELD OF THE INVENTION

The present invention relates to an insulated electrode, an electric furnace with an insulated electrode, and a process for producing molten metal, including foundry iron, using an insulated electrode. More particularly, the invention is directed to an insulated electrode having an insulating material surrounding and attached to portions of the electrode.

BACKGROUND OF THE INVENTION

Metals, such as foundry iron, used for casting and steel making, are produced in the metal industry by a number of different processes. One process of producing foundry iron utilizes a standard cupola-type furnace. A variety of iron sources are fed into the vertical shaft of the furnace fueled by combustion of coke by a blast of air. The charge added to the furnace generally contains a number of additives such as ferrosilicon to increase the silicon content of the iron and slag forming materials such as limestone to remove impurities such as sulfur.

The cupola-type furnace is a net silicon oxidizer whereby as much as 30 percent of the available silicon charged is lost by oxidation and discharged in the slag. Typically, only about 70 percent of the available silicon charged reports to the iron. Silicon is an essential element of foundry iron and is typically added in the form of ferrosilicon since such a form of silicon is readily combinable with the iron.

The feasibility of producing metals including foundry iron is dependent in part on the efficiency of the process used and cost of the charging materials. The cost of scrap iron and scrap steel depends on several factors including the iron content, amounts of desirable and undesirable alloy constituents present, and the particle size. The use of light scrap such as borings or turnings in a cupola requires agglomeration or briquetting since the high volume of gases exiting the cupola otherwise carries an unacceptably large percentage of the charge from the furnace.

Foundry iron is also produced with the electric induction furnace. A charge is heated and then additives, including silicon, carbon, and a slag forming material are introduced to cover the iron. The iron charge is heated by eddy currents resulting from electromagnetic induction from the alternating electric current flowing in the coil surrounding the charge. Silicon is typically added as ferrosilicon, and carbon is added in the form of a low sulfur content graphite material. The resulting iron generally has a silicon content of about 1–3 percent and a carbon content of about 2–4 percent.

Foundry iron has been produced commercially in standard-type electric arc furnaces (EAF). The EAF typically consists of a refractory lined vessel or shell with a removable refractory roof through which three electrodes in a three phase AC furnace, or one electrode in a DC furnace protrude into the space above the charge material and bath contained within the furnace shell. For DC furnaces, the return electrode is typically built into the bottom of the furnace shell.

The operation of the electric arc furnace typically involves charging the furnace by swinging the roof aside and emptying one or more charge buckets containing iron or steel scrap and other materials into the shell, closing the roof, and then lowering the electrodes until contact is made with the charge and arcing and melting of the charge occurs. After melting, a slag layer is usually established for refining purposes, and additions of ferrosilicon and carbon are made until the foundry iron composition reaches the desired target.

In recent years, the EAF has not been used extensively for production of foundry iron alloys because of the relatively high production cost. The EAF has been mostly limited by economics to the production of special alloy foundry irons and steels, which may not be readily or economically produced in either cupolas or induction furnaces.

Foundry iron is also produced by smelting iron ore in a submerged arc electric furnace. Submerged arc furnaces have an advantage of directly smelting the ores along with simultaneous carbothermic chemical reduction of metal oxides by the carbonaceous reducing agents, such as coke and coal. The electrodes are immersed in the charge and slag layer which forms above the molten iron. This arrangement permits efficient heat transfer between the arc and charge materials. However, the electrical conductivity of the charge must be controlled to permit the simultaneous immersion of the electrodes deep into the charge while avoiding excessive currents and overheating of the electrodes.

One example of the use of a submerged arc furnace to smelt iron ore is disclosed in U.S. Pat. No. 4,613,363 to Weinert. The carbothermic reduction of ores to produce iron requires large amounts of electric energy, thereby increasing the production costs. Alternatively, the more widely utilized processes of producing foundry iron (cupola and induction furnaces) require comparatively expensive starting materials and silicon carbide or ferrosilicon. All of these characteristics have limited these prior processes for producing foundry iron.

The electric arc furnace, such as the submerged arc furnace or open arc furnace, can be a cost-effective method of producing molten metals. For example, U.S. Pat. No. 5,588,982 to Hendrix discloses a process for efficiently producing foundry iron in an electric arc furnace by melting scrap metal while smelting an oxide such as silica. However, producing molten metals from a highly conductive charge, such as when the charge contains scrap metal, the present electric arc furnaces are inherently inefficient as a result of the construction of the electrode and particularly the cathode. Typically, the electrode is an uninsulated conductive rod of metal or metal alloy, graphite, or carbon. The electrode is provided with tapped ends for connecting several electrodes together and feeding the electrodes into the electric arc furnace during the melting process. The arc is produced at the tip of the electrode where the most efficient heating occurs. However, when the charge in the electric arc furnace is highly conductive, an open arc condition is created. This leads to inefficient heating of the charge and inefficient use of electricity.

Arc furnaces have been used to melt scrap metal as disclosed in U.S. Pat. No. 5,555,259 to Feuerstache. The furnace is formed with a center pipe surrounding the cathode which prevents the charge from contacting the side of the cathode. An arc is formed between the exposed end of the cathode and the metal bath, which is in contact with an anode for melting the charge. The lower end of the pipe is tapered for feeding the scrap to the cathode. The pipe surrounding the cathode enables the cathode to be positioned deep in the charge bed. This construction has the disadvantage of including a water-cooled, fixed, non-consumable barrier between the electrode and the charge.

Accordingly, the metals industry has a continuing need for an economical and efficient process for producing various metal alloys in an electric furnace.

SUMMARY OF THE INVENTION

Accordingly, a primary object of the present invention is to provide a method and apparatus for producing metal alloys in an electric furnace, particularly an electric arc furnace, using an insulated electrode.

Another object of the present invention is to provide an electrode for an electric furnace, particularly an electric arc furnace that can be immersed deep into a charge material within the furnace, while operating at high voltages and substantially independently of the resistivity of the charge material in the furnace.

Another object of the present invention is to provide an electric furnace, particularly an electric arc furnace electrode that is at least partially covered with an electrically insulating material to limit the surface area of the electrode in contact with charge materials.

Yet another object of the present invention is to provide an electrode support for connecting an insulated electrode to a power source.

A further object of the present invention is to provide an electrode for an electric furnace, particularly an electric arc furnace having a consumable insulating material surrounding at least a portion of the electrode.

Another object of the present invention is to provide an efficient and economical process for producing molten metals and metal alloys such as foundry iron using readily available and inexpensive feed materials such as scrap metal in an electric arc furnace.

A further object of the present invention is to provide an efficient process for using scrap iron or scrap steel as the primary source of iron for producing iron alloys.

Yet another object of the present invention is to provide an efficient process for melting scrap iron, scrap steel, direct reduced iron, or hot briquetted iron in an electric furnace, particularly an electric arc furnace.

A further object of the present invention is to provide a process for simultaneously smelting metal compounds contained in the charge materials, as well as additives contained in a consumable insulating material on an electrode for melting a charge material for producing a molten metal.

Another object of the present invention is to provide a process for producing iron alloys such as foundry iron where substantially no slag is formed.

A further object of the present invention is to provide a process for melting an iron or steel source in an electric furnace, particularly an electric arc furnace, while smelting or reducing a compound to produce iron alloys.

Another object of the invention is to provide a process for producing metal alloys from a primary metal source while smelting oxides of silicon, and metals, such as copper, iron, magnesium, manganese, chromium, nickel, calcium, aluminum, boron, zirconium, rare earth metals, and mixtures thereof in an electric furnace, particularly an electric arc furnace.

These and other objects of the present invention are basically attained by providing an electrode for an electric furnace comprising: an electrically conductive core having a first end, a second end and a longitudinal midsection between the ends. The first end of the conductive core has a first coupling member for connecting to a power source, and the second end has a second coupling member for coupling with a first coupling member of an adjacent electrode. An electrically insulating material surrounds and is attached to the midsection. The second end is free of the insulating material.

These objects are further attained by providing an electrode assembly for an electric furnace, comprising an electrically conducting member for connecting to an electrical power source, and at least one electrode coupled to the electrically conducting member. The electrically conducting member has first and second ends. The electrode has an electrically conductive core with a first end, a second end and a longitudinal midsection between the ends. An electrically insulating material surrounds and is bonded to the midsection. The first end of the electrode is coupled to the second end of the electrically conducting member.

These objects are further attained by providing an electric furnace, comprising a vessel having a melting zone and an inlet for feeding a charge into the vessel. At least one electrode assembly is positioned in the vessel. The electrode assembly includes an electrically conducting member having first and second ends, and at least one electrode having an electrode core with a first end coupled to the first member. An electrically insulating material surrounds and is bonded to a portion of the electrode core. The electrode assembly has a lower end substantially free of the insulating material which is positioned in the melting zone, and has the first end of the electrically conducting member coupled to an electrical power source. At least one second electrode is positioned in the vessel for producing heat in the melting zone with the electrode assembly.

These objects are also attained by a process of producing molten metal in an electric furnace comprising continuously feeding a charge into an electric furnace to form a charge bed. The furnace has at least one first electrode assembly with a lower end for cooperating with a second electrode. The first electrode assembly includes an electrically conducting member having first and second ends. The first end is coupled to a movable mounting structure for raising and lowering the electrode assembly with respect to a charge bed in the furnace. An electrode has an electrode core with first and second ends where the first end is removably coupled to the electrically conducting member. An electrically insulating material covers a portion of the electrode core and insulates the electrode from the charge bed. The charge comprises at least one metal, metal compound or mixture thereof. The electrode assembly is immersed into the charge bed. Electrical energy is supplied to the electrodes to convey electric energy therebetween. The charge bed is heated in the furnace by the electrical energy conveyed between electrodes to produce the molten metal.

The process of the present invention is able to utilize inexpensive scrap iron or steel in the electric furnace to produce iron alloys such as foundry iron, while controlling the carbon and silicon content and substantially in the absence of slag formation. A silica-containing material can be included in the charge or by the use of an insulated electrode. The silica sources are reduced to silicon in the presence of a carbonaceous reducing agent to increase and modify the silicon content of the metal alloy. The insulated electrode enables the electrode to be immersed deeper in the charge than an uninsulated electrode without reducing the voltage or the current. The carbonaceous reducing agent also provides carbon for smelting, and carbon which is dissolved in the molten metal alloy.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this original disclosure.

DETAILED DESCRIPTION OF THE INVENTION

Figure 1:
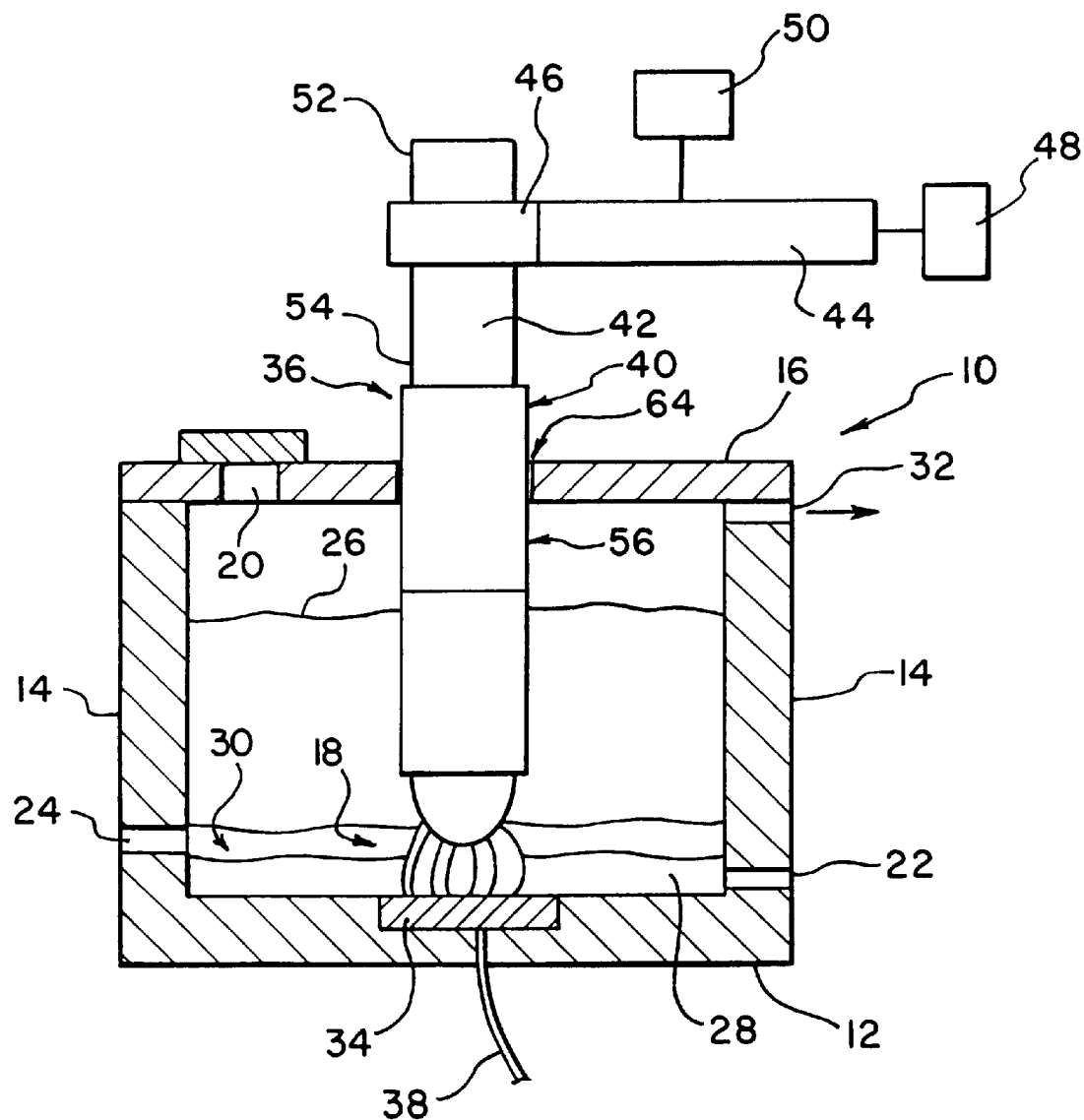
FIG. 1 is a side elevational view in section of an electric arc furnace for use in a process according to one embodiment of the present invention.

The present invention is directed to an insulated electrode, an electric furnace (particularly an electric arc furnace) having an electrode at least partially covered with an electrical insulation. The invention is further directed to a process of producing molten metal using the furnace. The insulation substantially covers the sides of the electrode leaving the tip exposed for conducting electrical energy and producing an arc in the furnace. The insulation enables the electrode to be immersed deeper into an electrically conductive charge bed at a given voltage and power input compared to standard or conventional uninsulated electrodes.

In embodiments of the present invention, the insulation covering the electrode can include a non-metal or metal compound-containing material. The insulation is gradually consumed along with the electrode during use. The insulation serves as a source for an alloying material for the primary metal in the feed. The metal compound is reduced to the metal in the furnace in the presence of a suitable reducing agent. The reducing agent can be, for example, a carbonaceous reducing agent. The insulation is preferably made of an inorganic material, such as a metal oxide, that can be reduced in the furnace to supply an alloying metal or other component to the primary metal of the charge.

Efficient production of alloys from charge materials that are good conductors of electricity in an electric arc furnace is achieved by deep penetration of the electrode into the charge bed. The electrode penetration improves the efficiency of the process, since the heat transfer efficiency from the electric arc relates to the depth of the arc below the surface of the charge. The enhanced heat transfer efficiency reduces the energy requirement, lowers the refractory consumption, lowers the electrode consumption, improves recovery efficiencies and produces higher yields.

The present invention is further directed to processes of producing metals and metal alloys using an electric furnace, particularly a submerged arc furnace, having a partially shielded or insulated electrode. The process of the present invention is particularly directed to producing molten metals including, for example, iron, foundry iron, aluminum, aluminum alloys, steel, copper, copper alloys, magnesium, manganese, chromium, nickel, zinc, lead, cadmium, precious metals and the like.

The process of the present invention is particularly suitable for producing foundry irons as well as other molten metals. The process of the present invention basically comprises feeding a primary metal source, such as scrap iron or steel, and carbonaceous materials which serve both as a carbon source for the iron and as a reducing agent, into an electric arc furnace. In embodiments of the present invention, a compound such as silica or a silica source can be added with the charge as a source of an alloying material. In further embodiments at least one of the electrodes of the electric furnace includes an insulating layer containing a compound which can be reduced in the furnace to provide an alloying material to mix with the primary metal. The compound can be a metal compound, such as a metal oxide. The compound can also be an oxide such as silica or silica-containing materials such as fiberglass.

The compound or metal oxide material is smelted by the electric arc to provide a source of metal or other alloying material to the charge. The heat produced by the electric arc or other electrical energy in the furnace reduces the alloying compound in the presence of a carbonaceous reducing agent to the alloying metal or other component which is taken up by the primary metal along with carbon from the reducing agents. In preferred embodiments, the process is carried out as a continuous process of simultaneously melting the primary metal sources and smelting metal oxide sources in the presence of the carbonaceous reducing agent.

As used herein, foundry iron is used to define the resulting iron product having at least about 0.05 percent by weight silicon and at least about 0.01 percent by weight carbon. The class of foundry iron includes various iron compositions, including, for example, pig iron, gray iron, ductile iron, malleable iron and cast iron. The foundry iron produced by the invention can be used directly without further processing to produce the desired product depending on the intended use of the iron. In further embodiments, the resulting foundry iron can be further processed to modify the composition and nature of the iron to produce steel.

In embodiments of the invention for producing foundry iron, the resulting foundry iron contains about 0.05 percent to about 12.0 percent silicon and about 0.01 percent to about 4.5 percent carbon with the balance iron and minor amounts of impurities such as sulfur, phosphorous, manganese, aluminum, chromium, titanium and other metals. As used herein the percentages are by weight unless otherwise indicated. In preferred embodiments of the invention, the foundry iron preferably comprises about 0.05 to about 12.0 percent silicon, and more preferably about 0.5 percent to about 4.0 percent silicon and about 2.0 percent to about 4.0 percent carbon. Typically, the foundry iron contains less than 3.0 percent silicon, about 2.0 percent to about 4.0 percent carbon and less than about 1.0 percent sulfur, phosphorous, aluminum, manganese, chromium and other impurities. Preferably, the foundry iron contains 0.10 percent by weight or less sulfur. In embodiments, the foundry iron contains about 0.25 to 3.0 percent by weight silicon. In further embodiments, the foundry iron contains about 2.0 percent by weight silicon.

Referring to FIG. 1, a suitable electric arc furnace for carrying out the process of the present invention is illustrated. The electric arc furnace 10 defines a vessel which includes a bottom lining or hearth wall 12, side walls 14 and a roof or top wall enclosure 16 to define a melting and smelting zone 18. A feed opening 20 is provided in the roof 16 for feeding the charge or feed material into the furnace 10 by conveyors or feed supplier (not shown). In an alternative feed system, the charge materials are introduced by dumping the feed directly on top of the existing charge 26 using a mechanical hopper charging scheme, as known in the art. One or more outlet taps 22 are included in the side wall 14 to withdraw molten metal 28 from the melting zone 18. A slag taphole 24 may also be included in side wall 14 to withdraw slag 30 from the melting zone 18.

The shell of the furnace 10 can be cooled with a water film (not shown). A spray ring can be located immediately beneath the side wall roof flange whereby the water is collected in a gutter at the bottom of the side walls 14. In embodiments of the invention, the roof or top wall can be split in its longitudinal dimension to allow charge material to be fed to any point in the furnace.

An exhaust duct 32 extends through the side wall 14 to collect and remove exhaust gases such as combustion gases, dust and fumes emitted during the melting and smelting phases of the process. The exhaust gases can be carried to a collection system or baghouse to clean the gases before discharging the gases to the atmosphere. The solids collected in the baghouse are recycled, processed, or discarded in a conventional manner.

The electric arc furnace illustrated in FIG. 1 is a DC electric arc furnace having an electrode 34 in the bottom wall 12 serving as an anode and an electrode assembly 36 extending through the roof 16 and serving as a cathode. The anode 34 is connected to a suitable DC power source by an electric connection 38. Preferably, the anode 34 is positioned below the electrode assembly 36.

Electrode assembly 36 extends through an opening 64 in the roof 16 into the melting zone 18 of the furnace 10. The electrode assembly 36 has a substantially cylindrical shape with a longitudinal dimension and is partially covered by an insulation layer 40.

Figure 2:
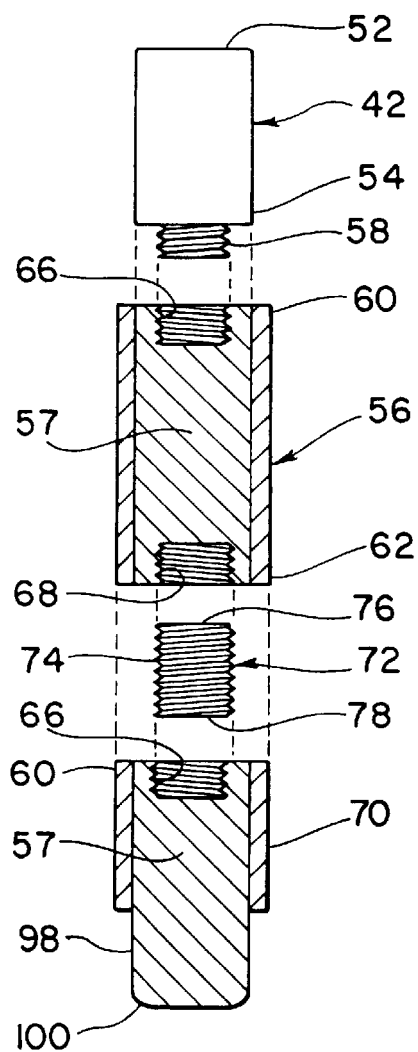
FIG. 2 is an exploded side elevational view, partially in section, of an electrode assembly coated with an insulating material according to a first embodiment of the present invention.

In the embodiment illustrated in FIGS. 1 and 2, electrode assembly 36 includes a cylindrical electrically conducting member 42 which is clamped to an electrically conducting bus bar 44 by a clamping member 46. Bus bar 44 is connected to an electrical power source 48 to supply electrical power to electrode assembly 36. The bus bar 44 is also coupled to a support assembly 50 for raising and lowering the electrode assembly 36 into the charge 26 through opening 64 in the roof 16 of furnace 10.

Referring to FIG. 2, electrically conducting member 42 has a substantially cylindrical shape with an upper end 52 for coupling with bus bar 44 and a lower end 54 for coupling with an electrode 56. In the embodiment illustrated, lower end 54 includes external threads 58. Electrically conducting member 42 is made of a suitable metal, such as copper, copper alloys or other metals, for supplying electrical power to electrode 56. In further embodiments, electrically conducting member 42 is made of graphite, carbon or other electrically conducting materials. In the embodiment illustrated, the electrically conducting member is solid. In further embodiments, the upper end of the electrically conducting member is hollow. The upper end can be cooled by passing water or other coolants through the hollow portion of the electrically conducting member.

Electrode 56, as shown in FIG. 2, has a substantially cylindrically shaped core 57 having a longitudinal dimension with an upper end 60 and a lower end 62. Upper end 60 includes an internally threaded recess 66 dimensioned for coupling with external threads 58 of electrically conducting member 42. Lower end 62 includes an internally threaded recessed portion 68 extending longitudinally. Electrode core 57 is typically made of graphite or carbon. In the embodiment illustrated, the core 57 is solid.

An electrically insulating material 70 surrounds the longitudinal midsection of electrode core 57. Preferably, insulating material 70 completely covers the sides of electrode core 57 so when two or more of the electrodes 56 are coupled together, the insulating materials on each electrode 56 form a continuous insulating layer as shown in FIG. 1.

A threaded coupling member 72 as shown in the embodiment of FIG. 2 has a substantially cylindrical shape with continuous external threads 74 extending from a first end 76 to a second end 78. The coupling member 72 is dimensioned to complement the threaded recesses 66 and 68 of electrode 56. The external threads 74 of coupling member 72 can be threaded into the recesses 66 and 68.

Figure 3:
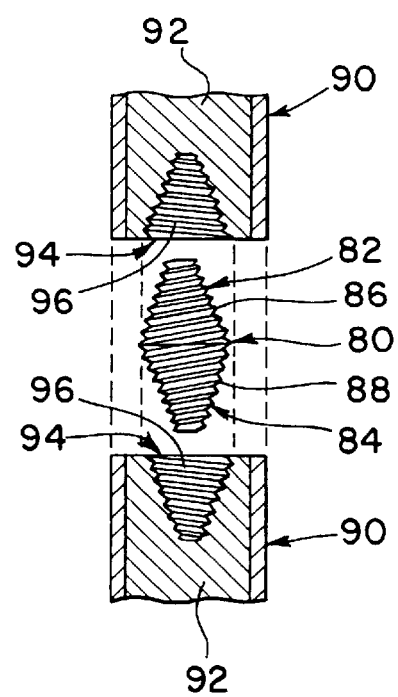
FIG. 3 is a partial side elevational view in section of an insulated electrode member according to a second embodiment of the present invention.

Referring to FIG. 3, a further embodiment is illustrated which includes a coupling member 80 having tapered, frustoconical end portions 82 and 84. The end portions 82 and 84 have external threads 86 and 88, respectively, to couple with electrodes 90. Electrodes 90 have an electrically conductive core 92 having a frustoconical recess 94 at each end similar to the embodiment of FIG. 2. The recess 94 has threads 96 for coupling with the threads of coupling member 80.

In embodiments, electrode assembly 36 can include two or more identical electrodes 56 coupled together end-to-end as shown in FIGS. 1 and 2. The threaded coupling member 72 is dimensioned to complement the internally threaded recesses 66 and 68 so that a plurality of the electrodes can be coupled together to obtain an electrode assembly of the desired length. The lower end 98 of the bottom electrode section of the electrode assembly 36 is without electrically insulating material for producing an arc between the tip 100 of lower end 98 and the counter electrode in the furnace. In further embodiments, a portion of the insulating material can be stripped from the electrode to expose the tip 100 of the electrode.

In use, the uninsulated tip 100 forms an arc with or otherwise conveys electrical energy to the counter electrode in the furnace 10 to melt the charge. As the electrode 56 is consumed during the melting process, the electrode assembly 36 is lowered into the furnace to position the tip 100 of the electrode at the desired depth in the charge. The electrode 56 can be removed from the electrically conducting member 42 and a new coupling member attached to the internally threaded portion 66 of the partially consumed electrode 56. A new electrode is attached to the electrically conducting member. The resulting assembly is then attached to the electrically conducting member 42. In this manner, the entire electrode is consumed and it is not necessary to discard the remaining portions that are too short to be inserted into the charge materials.

Insulating material 70 is preferably an inorganic material capable of electrically insulating the electrode core 57 from the charge material 26. In addition, insulating material 70 preferably is an inorganic material containing a compound that can be reduced or smelted in the furnace to a metal or other component for supplying an alloying metal or component to the primary metal in the charge. The insulating material is typically a glass, ceramic or mineral fiber material. Suitable materials include calcium silicate, diatomaceous earth, silica fireclay, high alumina diaspore clays, calcium aluminate, zirconia, magnesite, dolomite, forsterite, chromium ores, berylia, thoria, and mixtures thereof. In further embodiments, the insulating material is selected from the group consisting of oxides of aluminum, boron, cobalt, chromium, nickel, magnesium, manganese, phosphorous, silicon, zirconium, thorium, rare earth metals, and mixtures thereof. The insulating material can be applied to the electrode using standard coating processes such as, for example, casting, painting, dipping or spraying. In embodiments, a mineral fiber mat of insulating material can be applied by wrapping and clamping with suitable clamping devices. Alternatively, the mat can be glued in place using a suitable adhesive.

The adhesive is preferably an adhesive that will effectively bond the insulating material to the electrode core 57 during use of the furnace without interfering with the processing of the metal or the operation of the furnace. Alternatively, the insulating material can be impregnated with an adhesive that can be activated by a solvent or heat to fuse the layers together. The adhesive is generally a furnace type cement such as sodium silicate or calcium aluminate cements. Other suitable adhesives include phosphorous oxides, pitch-based adhesives and tar-based adhesives.

Other coating methods include, for example, thermal spraying, such as plasma and flame spraying, fusion coatings, such as electrophoretic coatings, electrostatic coatings and solgel ceramic coatings. Alternatively, the insulation can be applied by surface modification such as by electrolytic anodization. In a further embodiment, the insulation can be a preformed sleeve of suitable refractory material which fits over the electrode core. The sleeve can be secured to the electrode in the desired position by adhesives, clamps, or other fastening means.

The insulating material can be woven or non-woven mats, such as mineral fiber mats, that are commercially available. In preferred embodiments, the thickness of the formed insulation layer 70 is about ⅛ to ½ inch, but can be thicker or thinner depending on the dielectric properties of the insulating material, operating conditions of the furnace and the composition of the charge fed to the furnace. In embodiments, about ½ to 3 feet of the lower end of the electrode assembly 36 is exposed beyond the insulating material. Preferably, the thickness of the insulation is sufficient to resist dielectric breakdown of the insulation during furnace operation.

Figure 4:
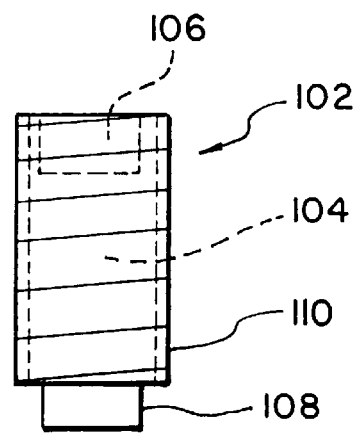
FIG. 4 is a side elevational view of an insulated electrode member according to a further embodiment of the invention.

In a further embodiment shown in FIG. 4, an electrode 102 has an electrically conductive core 104. The electrode core 104 has an upper end with a substantially cylindrical shaped recess 106 and a lower end with a substantially cylindrical shaped projection 108. The projection 108 is dimensioned to fit tightly within recess 106 of an adjacent electrode. A suitable electrically conductive adhesive can also be used to secure the electrodes together. The upper end of electrode core 104 is coupled to an electrically conducting member as in the embodiment of FIGS. 1 and 2. In further embodiments, other coupling members can be used to connect the electrodes together.

In the embodiment shown in FIG. 4, the electrode core 104 can be wrapped in a spiral manner with a first mat 110 of electrically insulating material that is fed from a supply roll to form a continuous first insulating layer. An optional second mat of insulating material can be wrapped over the first layer in a spiral fashion opposite the first mat to form a second continuous layer. Preferably, the mats are wrapped in an overlapping pattern to ensure complete coverage of the electrode core 104. In preferred embodiments, an adhesive is applied to the electrode core 104 to secure the insulating mats in place. The adhesive can be sprayed onto the electrode by a suitable spray nozzle. In alternative embodiments, the adhesive can be applied to the electrode core 104 and/or the insulating mats by any suitable method such as painting, rolling, dipping or extrusion. In further embodiments, the adhesive can be incorporated within the insulating mat.

Referring to FIGS. 1 and 2, the insulating layer 70 covers a length of the electrode core 57 sufficient to effectively insulate the electrode assembly 36 from the charge materials in the furnace 10 and permit the electrode assembly 36 to be penetrated deep into the charge bed independent of the conductivity or resistivity of the charge bed. In the embodiment shown, the insulation covers a middle section or midsection around the circumference of the electrode assembly 36. In this manner, the tip 100 of the electrode assembly 36 is exposed for producing the arc, while the remaining length of the electrode assembly 36 within the furnace 10 is electrically insulated from the charge materials 26.

The electrode core can be, for example, graphite electrodes, prebaked carbon electrodes, Soderberg or self-baking carbon electrodes, metal electrodes or metal alloy electrodes as known in the art. The electrode cores are preferably graphite electrodes of the various forms known in the art.

In operation of the furnace 10, a charge is fed through opening 20 into the furnace 10 and the electrode assembly 36 is lowered into the charge bed 26 and above the anode 34. Electric current is supplied to the electrodes 34 and 36 from power source 48 to produce an arc between the lower end of the electrode assembly 36 and the electrode 34. The insulating layer 70 on the electrode assembly 36 shields the electrode core 57 from the charge material 26 so that the electrode assembly 36 can be positioned deep into the charge bed 26 without adjusting the resistivity of the charge bed or the power levels to the electrodes. During arcing, the lower end 62 of the electrode assembly 36 is gradually consumed so that the position of the bus bar 44 is adjusted to maintain the proper position of the electrode assembly 36 in the charge bed 26. The lower end of the insulating layer 70 is exposed to the intense heat from the arcing at the tip 100 of the electrode assembly 36. The insulating material can provide various metals or other components to the molten metal produced in the furnace. The metal compound of the insulating material is reduced to the elemental metal in the presence of a suitable reducing agent which is then combined with the primary metal of the charge. The thickness and composition of the insulating layer is selected to provide the desired amount of alloying metals or other additives to the charge.

Examples of suitable electric furnaces, particularly electric arc furnaces, are produced by Mannesmann Demag Huettentechnik AG of Duisburg, Germany (including the Contiarc furnace) and by Elkem Technology of Oslo, Norway. The DC electric arc furnace typically has a single upper electrode submerged in the charge with a suitable return electrode (e.g. anode) in the bottom of the vessel as known in the art. The furnace can be an AC electric arc, DC electric arc, AC submerged arc or DC submerged arc furnace. In further embodiments, a plasma electric arc furnace or an alternating current electric arc furnace having at least two electrodes can be used.

In a further embodiment, the furnace is an alternating current furnace having three electrodes extending through the roof into the melting zone. The electrodes can be arranged in triangular or in-line configurations. One or more of the electrodes can have an insulating layer in the manner of the embodiments of FIGS. 1–3. The electrodes are independently controllable to selectively adjust their vertical position within the furnace, and to prevent overcurrents. The electrodes can be raised or lowered to vary the arc length as known in the art. The furnace is typically a three phase alternating current furnace powered by variably selectable voltage of about 30–400 volts with a maximum current of approximately 100,000 amperes per phase.

The electric arc furnace provides continuous production of molten metal, such as foundry iron, by permitting continuous feeding of the furnace with the charge material and tapping of the molten metal from the lower regions of the furnace. The process can be readily scaled up for high production rates, while still controlling the output rate and the output composition of the metal. A suitable feed conveyor, hopper charging system, or charging tube as known in the art, can be used for continuously supplying the charge materials to the furnace. The throughput or production rate of the furnace is dependent on the power supplied to the furnace and the feed rate of materials to the furnace. The furnace can be designed for an operating power level of from about 1 megawatt to about 100 megawatts depending on the furnace construction, type of electrodes and charge materials. Generally the electric arc furnace produces a ton of foundry iron product at an electric energy input of about 600 kilowatt-hours. Depending on the charge materials, product characteristics, and furnace construction, an alternating current electric arc furnace can produce foundry iron at a rate of electric energy input of between about 500 to 1400 kilowatt-hours per ton of product.

The process of the invention can be carried out in an electric arc furnace using a feed and power level so that the tips of the electrodes are embedded several feet into the bed of feed material in the furnace and within about one foot from the bath of molten metal pool. In this manner, the arc zone is formed close to the metal pool or bath. The furnace is operated to maintain the temperature of the molten alloy bath in the furnace between about 2100° F. to 3200° F. In preferred embodiments the temperature of the bath is maintained sufficiently high to allow adequate superheating of the molten metal for easy tapping and downstream handling or processing. The tip of the electrode being submerged in the material and producing an arc close to the molten metal bath provides good heat transfer to the unprocessed material by radiation from the arc and the molten metal, and by convection from the hot plasma gases and carbon monoxide gas that is continuously being generated by the chemical reduction of metal oxides and silica by carbon in the lower regions of the charge bed. A DC submerged arc furnace is generally operated at a voltage of about 30–400 volts and a maximum current of about 100,000 amperes per phase.

A standard electric arc furnace includes a self-protection mechanism or control system to automatically raise the electrode from the hearth to prevent excessive electrode currents which can result when the conductivity of the charge materials increases above a predetermined level. If the electrode tip remains too high, the temperatures near the furnace hearth decreases and, if prolonged, can result in inadequate heating and melting of the metal and incomplete smelting of the oxides such as the silica. It is important to have the height of the charge feed bed so that the electrode tip can be positioned to form the arc about a foot above the metal bath.

Satisfactory immersion or penetration of the electrode is achieved by providing the electrical insulating material along a substantial length of the upper electrode in an electric arc furnace. Since the majority of the electrode is electrically insulated from the charge materials, the tip of the electrode can be immersed into the charge deeper than with uninsulated electrodes, and thus, achieve improved heating of the charge. This deeper electrode penetration made possible by the insulated electrode configuration results in better heat transfer to the charge by the arc and the passage of hot reaction product gases through the relatively deeper charge bed, with consequent lowered specific electrical power consumption for the process.

Achieving the satisfactory immersion or penetration of the electrodes of an AC electric arc furnace into the furnace charge bed is dependent on several factors including the specific electrical resistivity or conductivity of the materials charged, proper selection and proportioning of materials in keeping with their specific electrical resistivity, their physical sizing, their distribution in the mix, and the operating voltage selected for the furnace. The operating voltage is selected to compensate for the relationship between the voltage, the electrode current, and the resistance of the charge materials to achieve deeper immersion of the electrodes into the charge. The resistance of the charge bed can be varied by varying the feed materials and size of materials to optimize operation to obtain the deepest electrode penetration in the charge bed for a given operating voltage.

The quantity of electrical energy required per ton of metal produced is highly dependent on the degree of oxidation or reduction of the metallic materials charged, the amount of silica and other oxides required to reach the desired or target composition, the optimization of the electrode submerged operation, and the skill of the furnace operator. For example, iron alloys containing from about 0.5 percent to 4 percent carbon and about 0.25 percent to about 2.5 percent silicon typically require about 500 to about 650 kilowatt-hours per ton of alloy produced. Higher silicon percentages and correspondingly lower carbon percentages require an increase of about 10 kilowatt-hours for highly non-oxidized iron sources for each additional 0.1 percent increase in silicon above about 2.5 percent silicon in the alloy.

The raw materials constituting the charge to be fed to the arc furnace are preferably blended prior to feeding. Alternatively, the different components of the charge can be fed simultaneously from separate supplies into the furnace at a controlled rate and in the desired ratios. The composition of the resulting metal is dependent on the charge composition and the degree of chemical reduction which occurs in the furnace.

In producing foundry iron, the charge materials comprise an iron source which includes scrap iron or scrap steel, a silicon source and a carbonaceous reducing agent as discussed hereinafter in greater detail. Generally, silica is the primary silicon source which can be supplied with the charge, supplied by the consumption of the electrode and the silica-containing insulation and combinations thereof. The melting of the iron and smelting of the silica and metal oxides in preferred embodiments is substantially in the absence of an oxygen feed or oxidizing agent and an absence of slag forming materials.

In further embodiments, the primary metal of the charge is aluminum, copper, magnesium, manganese, chromium, nickel, zinc, lead, cadmium, precious metals, such as gold and silver, and oxides and alloys thereof. The metal source can be scrap metals or other metal sources.

The scrap iron and scrap steel are available as commodities as known in the metal industry. The market prices and grades of various types of scrap iron and steel are published regularly in various industry publications such as *American Metal Market*. Scrap iron and steel as known in the art is graded according to the metal particle size and composition. For example, one type of scrap steel is defined as: "Foundry steel, 2' max." Suitable sources of iron for use in the present invention include iron ores, mill scale, direct reduced iron (DRI), hot briquetted iron (HBI), iron carbide, iron borings, steel turnings, shredded automobile steel and steel cans and mixtures thereof.

The composition of the scrap iron or steel will influence the composition of the resulting foundry iron. Several sources or grades of scrap iron can be blended prior to feeding to the furnace to provide the desired input and output compositions. The iron source generally comprises at least about 50 percent scrap, preferably about 75 percent scrap, and most preferably about 90 percent by weight scrap iron or scrap steel. The iron source can be based entirely on scrap iron or steel.

The scrap iron or steel can be mixed with other iron or steel materials to increase or decrease the percentage of various alloying metals in the resulting foundry iron composition. For example, direct reduced iron (DRI) and hot briquetted iron (HBI), which typically contain about 90 percent iron, can be added to increase the iron content of the foundry iron thereby diluting the alloying metals and reducing the percentage of undesirable metals.

The amount and type of materials combined with the scrap iron and scrap steel are determined in part by the efficiency of the furnace in utilizing their components and the relative cost of the feed materials. For example, heavy steel scrap that is low in undesirable residual elements, is expensive in comparison with cast iron borings or steel turnings, so that large quantities of heavy scrap, are usually undesirable from an economic standpoint. By comparison, steel turnings, which are inexpensive compared to heavy steel scrap, usually contain high levels of undesirable residual elements. The use of the submerged arc furnace permits the use of very finely sized scrap materials, which, being less expensive than heavy scrap is an economic advantage for producing foundry iron over other processing methods.

The particle size of the charge material is important to obtain proper heating and melting of the scrap although there is no absolute limit. The scrap metal generally has a size of 60 centimeters or less in any one dimension. A suitable size of the scrap metal is about 25 millimeters or less. In alternative embodiments, the particle size of the scrap metal is less than about 0.5 centimeters. The particle size of the feed is selected to be easily handled and charged into the furnace and melted without forming a bridge between the electrodes or between the electrodes and the side walls of the furnace. The electric arc furnace in accordance with preferred embodiments is able to handle a small particle size scrap less than about 0.25 inch in the largest dimension. The particle size of the scrap iron or steel can range from small fines or borings to large pieces. The upper size limit is generally the face to face spacing between the electrodes in an alternating current submerged arc furnace or between the electrode and the furnace refractory wall in a direct current submerged arc furnace to avoid bridging.

Scrap metals are highly conductive in comparison with ores so that the electrode must be adequately insulated for an electric arc furnace or the electrical conductivity and resistivity of the feed must be selected and controlled to permit deep immersion of the electrodes. The electrical resistivity of the feed can be modified by the selection of the particle size of the feed and the type of materials. Reducing the particle size of the feed material increases the resistivity of the feed. The most efficient particle size will depend on its inherent resistivity and the dependence of the permeability of the furnace charge to the passage of exhaust gases on the particle sizes of the charged materials.

In the production of foundry iron, the feed material contains substantially no ore although minor amounts of ores can be added to modify the resistivity of the feed. Highly oxidized mill waste or resistive metal sources can also be used to modify the resistivity.

The charge material can also include an amount of a silicon source such as, for example, silica, silica source or silicon dioxide in a reducible form. Silica, and particularly, quartzite, is the preferred silicon source. The source of the silicon can be any commercially available material which can be smelted and reduced to silicon in the arc furnace in the presence of a carbonaceous reducing agent simultaneously with the melting of the primary metal source. The silicon is produced in a form which can combine directly with the molten metal. In alternative embodiments, silica-containing ore, waste residues and sand which has been washed to remove impurities can be used. Typically, the charge is substantially absent of ferrosilicon or silicon carbide. In preferred embodiments, the silicon source contains at least about 98 percent by weight silica. The impurities are preferably removed to avoid the formation of slag in the furnace since slag increases the energy demand for smelting and melting of the feed.

The quartzite used in preferred embodiments as the primary silica source is substantially free of clays and other extraneous materials such as metal oxides which would contribute to undesirable slag formation, as well as undesirable contamination of the resulting foundry iron with trace metals. The quartzite is generally sized, high purity quartzite pebbles or crushed quartzite containing at least 95 percent silica. The particle size of the source of silica is determined by the particular dimensions of the furnace, the electrodes and the residence time of the feed materials in the furnace to ensure complete reduction to silicon in the presence of a reducing agent. Generally, quartzite has a particle size of 4 inches or less although large furnaces can utilize larger particles. The source of silica preferably contains less than about 0.5 percent by weight aluminum, magnesium, zinc and titanium oxides. Some of these metals, such as zinc, can be oxidized and removed by a flow of air or oxygen through the furnace and removed in the baghouse. Other metal oxides are reduced in the furnace to the metal which can combine with the primary metal.

The amount of the silicon source added to the furnace with the feed is determined by theoretical calculations of the desired silicon content of the resulting foundry iron or other primary metal. The amount of the silicon source added is also based on stoichiometric calculations taking into account the calculated silicon content of the feed metals and the calculated losses due to predicted volatilization in the reduction of silica to elemental silicon. The silicon source can be added in the amount of about 0.01 percent to about 20 percent by weight based on the weight of the scrap iron or steel. Typically, the silicon source is less than about 10 percent and preferably less than about 5 percent by weight of the scrap iron or steel. Generally, about 90 percent or more of the available silicon combines with the iron while the remaining silicon is lost as silica fume, and, if formed, as slag. Silicon recoveries typically greater than 90 percent are experienced when alloys of 3% or less contained silicon are produced.

The carbonaceous reducing agent can be any carbon source capable of reducing silica and other metal compounds in the furnace. Examples of suitable carbonaceous reducing agents include char, charcoal, coal, coke such as petroleum or bituminous coke, woodchips and mixtures thereof. The preferred carbonaceous materials have a high fixed carbon content and also have a low ash content, low moisture content, low calcium oxide and aluminum oxide levels, and low sulfur and phosphorous levels. The carbonaceous materials in preferred embodiments further have high reactivity and high electrical resistance. A preferred carbonaceous material for AC submerged arc furnace operations is bark-free, hardwood woodchips from a hardwood such as oak. Woodchips provide a source of carbon for reducing the silica to elemental silicon as well as a means of reducing the electrical conductivity of the feed in the furnace so that the electrodes can be deeply immersed into the submerged arc furnace to maintain the desired melting temperature of the scrap and smelting of the silica. The feed can contain about 5 percent to 40 percent by weight of the carbonaceous reducing agents based on the weight of the iron. Preferably, the feed contains at least about 5 percent carbonaceous reducing agents based on the weight of iron.

The amount of the carbonaceous reducing agent added to the feed is determined by calculating the stoichiometric amount of fixed carbon needed to reduce the metal compound to the metal and the amount of free carbon needed to provide the desired carbon content in the resulting molten metal. The theoretical calculations are based on the fixed carbon content of the coal, charcoal, coke, woodchips or other carbonaceous reducing agent according to standard calculations as known in the metallurgical industry. The amount, type and particle sizes of the carbonaceous reducing agent affect the resistivity of the feed material. For example, charcoal can be used in large proportions to increase resistivity since preferred charcoals have a higher resistivity than coke or coal. The process can be conducted in the complete absence of coke.

The particle size of the carbonaceous reducing agent is selected according to the composition of the feed materials, the reactivity, and the electrical resistivity or conductivity of the feed composition. A suitable size of woodchips is generally about 6 inches or less in the longest dimension. A suitable size for metallurgical grade coke is about ½ inch or less. Coal is typically about 2 inches or less while char and charcoal are typically 6 inches or less in the largest dimension.

In the production of foundry iron, the charge composition preferably contains only minor amounts of impurities to minimize slag formation to reduce energy consumption. The absence of slag enables preheating the feed material by the heat from the molten metal. Excessive slag formation also inhibits the flow of the feed materials to the heating zone of the furnace and increases the likelihood of bridging of the feed in the furnace.

In embodiments where the feed material contains high amounts of sulfur or other impurities, a slag forming component can be added as needed. Suitable slag forming components include limestone (calcium carbonate), lime (calcium oxide), or magnesia although other slag forming components as known in the art can be used. When necessary for efficient operation, lime having a particle size of less than 3 millimeters can be used.

In embodiments, the process for producing foundry iron is carried out in the direct current (DC) electric arc furnace configured with an electrically-insulating coating or sleeve surrounding the upper electrode for much of the distance that the electrode is extended into the furnace charge. The use of an AC or DC electric arc furnace using the insulated electrode facilitates deep penetration of the upper electrode into the charge materials and close proximity of the electrode tip to the metal bath.

In embodiments of the invention, the process of producing foundry iron is carried out in an electric arc furnace in the absence of iron ore and coke, and generally produces a foundry iron product having a temperature of between about 2100° F. to 3200° F. and less than about 0.1 percent by weight slag compared with 1 percent to 10 percent by weight slag of conventional foundry iron processes using a submerged arc furnace. Typically, the foundry iron is produced substantially in the absence of slag.

Embodiments of the process of the invention are disclosed in the following non-limiting example.

EXAMPLE 1

A computer simulated operation consisted of a feed mix containing 2000 pounds of scrap iron, 100 pounds of woodchips, 85 pounds of coal, 20 pounds of coke and 75 pounds of quartzite charged into an alternating current submerged arc furnace at a rate of alloy production of 72.590 tons per hour. The projected power input to the furnace was 50,000 kilowatts. The simulated scrap iron feed was made up of 40 percent shredded auto steel, 15 percent remelt returns, 15 percent steel scrap #1, 20 percent Cast Iron borings, 5 percent tin plate/cans and 15 percent low chromium mixed turnings. The feed mix had a calculated alloy composition of 2.5 percent silicon, 3.85 percent carbon, 0.40 percent manganese, 0.10 percent chromium, 0.15 percent nickel, 0.15 percent copper, 0.01 percent sulfur, 0.05 percent phosphorus and 0.03 percent tin with the balance iron where the percentages are by weight.

The projected resulting iron product as tapped from the furnace had an iron content of 92.5 percent, a carbon content of 3.85 percent and a silicon content of 2.50 percent by weight with the balance impurities. The calculated energy consumption was 650 kilowatt hours per ton of the iron alloy.

While several embodiments have been shown to illustrate the invention, it will be understood by those skilled in the art that various changes and modifications can be made therein without departing from the scope of the invention as defined in the appended claims.

What is claimed is:

1. An electrode for an electric furnace comprising:
an electrically conductive core having a first end, a second end and a longitudinal midsection between said ends, said first end of said conductive core having a first coupling member for connecting to a power source, and said second end having a second coupling member for coupling with a first end of an adjacent electrode; and
an electrically insulating material surrounding and attached to said midsection, said second end of said core being free of said insulating material, said electrically insulating material forming a substantially continuous insulating layer over said midsection and being consumable during arcing in an electric arc furnace.

2. The electrode of claim 1, wherein said first coupling member is an internally threaded portion in said first end of said core; and said second coupling member is an internally threaded portion in said second end of said core, wherein said electrode further comprises a threaded coupling member for coupling to said internally threaded portions of said core.

3. The electrode of claim 1, wherein said insulating material is a mineral fiber mat wrapped around said core.

4. The electrode of claim 3, wherein the mineral fiber mat is glued, wrapped or clamped to said core.

5. The electrode of claim 1, wherein said insulating material is cast, painted, dipped, or sprayed onto said core.

6. The electrode of claim 1, wherein said insulating material includes an adhesive for bonding said insulating material to said electrically conductive core.

7. The electrode of claim 6, wherein said adhesive is selected from the group consisting of sodium silicate, calcium silicate, phosphorus oxide, calcium aluminate, pitch, tar-based adhesives, and mixtures thereof.

8. The electrode of claim 1, wherein said insulating material comprises silica.

9. The electrode of claim 1, wherein said insulating material has a thickness to resist dielectric breakdown of said insulating material during furnace operation.

10. The electrode of claim 1, wherein said insulating material is selected from the group consisting of glass, ceramics, mineral fibers, calcium silicate, diatomaceous earth, silica fireclay, high alumina diaspore clays, calcium aluminate, zirconia, magnesite, dolomite, forsterite, chromium ores, berylia, thoria, alumina, rare earth metal oxides, and mixtures thereof.

11. The electrode of claim 1, wherein said insulating material is selected form the group consisting of oxides of aluminum, boron, cobalt, chromium, nickel, magnesium, manganese, phosphorous, silicon, zirconium, rare earth metals, and mixtures thereof.

12. The electrode of claim 2, wherein said insulating material extends from said first end of said core to said second end of said core.

13. An electrode assembly for an electric furnace comprising:

an electrically conducting member for connecting to an electrical power source, said electrically conducting member having first and second ends; and at least one electrode having an electrically conductive core with a first end, a second end and a longitudinal midsection between said ends, and having an electrically insulating material surrounding and bonded to said midsection forming a substantially continuous electrically insulating layer, said first end of said core being coupled to said second end of said electrically conducting member, said electrically insulating layer being consumable during arcing in an electric arc furnace.

14. The electrode assembly of claim 13, wherein said second end of said electrically conducting member comprises an externally threaded portion; and said first end of said electrode includes an internally threaded portion for receiving said externally threaded portion of said electrically conducting member.

15. The electrode assembly of claim 13, wherein said insulating material is a mineral fiber mat.

16. The electrode assembly of claim 13, wherein said insulating material is selected from the group consisting of glass, ceramics, mineral fibers, calcium silicate, diatomaceous earth, silica fireclay, high alumina diaspore clays, calcium aluminate, zirconia, magnesite, dolomite, forsterite, chromium ores, nickel oxides, berylia, thoria, alumina, rare earth metals oxides, and mixtures thereof.

17. The electrode assembly of claim 13, wherein said insulating material is selected from the group consisting of oxides of aluminum, boron, cobalt, magnesium, phosphorous, silicon, nickel, chromium, zirconium, rare earth metals, and mixtures thereof.

18. The electrode assembly of claim 13, wherein said electrode is removably coupled to said electrically conducting member.

19. The electrode assembly of claim 13, comprising a plurality of electrodes coupled together, wherein said second end of each core is coupled to said first end of an adjacent core.

20. An electric furnace, comprising:

a vessel having a melting zone and an inlet for feeding a charge into said vessel;

at least one electrode assembly positioned in said vessel, said electrode assembly including an electrically conducting member having first and second ends, and including at least one electrode having an electrode core with a first end coupled to said electrically conducting member and having an electrically insulating material surrounding and bonded to a portion of said electrode core forming a substantially continuous insulating layer, said electrode assembly having a lower end substantially free of said insulating material and positioned in said melting zone, said first end of said electrically conducting member being coupled to an electrical power source, said insulating layer being consumable during arcing in said vessel to supply an alloying material to a molten metal produced in said vessel; and at least one second electrode positioned in said vessel for producing heat in said melting zone with said electrode assembly.

21. The electric furnace of claim 20, wherein said electrode core has a longitudinal midsection extending between said first end and a second end, said insulating material substantially covering said midsection.

22. The electric furnace of claim 20, wherein said insulating material is selected from the group consisting of glass, ceramics, mineral fibers, calcium silicate, diatomaceous earth, silica fireclay, high alumina diaspore clays, calcium aluminate, zirconia, magnesite, dolomite, forsterite, chromium ores, berylia, thoria, rare earth metal oxides, and mixtures thereof.

23. The electric furnace of claim 21, wherein said insulating material is selected from the group consisting of oxides of aluminum, boron, cobalt, chromium, nickel, magnesium, manganese, phosphorous, silicon, zirconium, and mixtures thereof.

24. The electric furnace of claim 20, wherein said insulating material is a mineral fiber mat wrapped around said electrode core.

25. The electric furnace of claim 20, wherein said insulating material includes a bonding material for bonding said insulating material to said electrode core.

26. The electric furnace of claim 20, wherein said insulating material includes an adhesive selected from the group consisting of sodium silicate, calcium silicate, phosphorous oxide, calcium aluminate, pitch, tar-based adhesives, and mixtures thereof.

27. The electric furnace of claim 20, wherein said furnace is selected from the group consisting of an AC electric arc, DC electric arc, plasma arc, DC submerged arc and AC submerged arc furnace.

28. The electric furnace of claim 20, wherein said insulating material has a thickness sufficient to resist dielectric breakdown of said insulating material during furnace operation.

29. A process of producing molten metal in an electric furnace, comprising the steps of:

continuously feeding an electrically conductive charge into an electric furnace to form a charge bed, said furnace having at least one electrode assembly and an additional electrode, said electrode assembly being coupled to a movable mounting structure for raising and lowering said electrode assembly with respect to a charge bed in said furnace, said electrode assembly having a first electrode core with first and second ends, a first electrically insulating material surrounding and bonded to said first electrode core, at least one second electrode core with a first end coupled to said second end of said first electrode core and having a second end, and a second electrically insulating material surrounding and bonded to said second electrode core forming a substantially continuous insulating layer with said first insulating material on said first electrode core to insulate said electrode assembly from said charge bed, said charge comprising at least one metal, metal compound or mixture thereof;

immersing at least said electrode assembly into said charge bed at a depth independent of the electrical conductivity of said charge bed;

supplying electrical energy to said electrode assembly and additional electrode to convey electric energy therebetween; and heating the charge bed in the furnace by the electrical energy between said electrodes to produce said molten metal, said insulating layer being consumed during heating to supply an alloying material to said molten metal.

30. The process of claim 29, wherein said first electrode core has a midsection between said first and second ends, and said electrically insulating material overlies and is bonded to said midsection.

31. The process of claim 30, wherein said first and second electrically insulating materials are a mineral fiber mat wrapped around said first and second electrode cores forming a continuous insulating layer.

32. The process of claim 29, wherein said first and second insulating materials include an adhesive for bonding said insulating material to said first and second electrode cores.

33. The process of claim 32, wherein said adhesive is selected from the group consisting of sodium silicate, calcium silicate, phosphorous oxide, calcium aluminate, pitch, tar-based adhesive, and mixtures thereof.

34. The process of claim 29, wherein said first and second insulating materials have a thickness sufficient to resist dielectric breakdown of said insulating materials during furnace operation.

35. The process of claim 29, wherein said first and second insulating materials are selected from the group consisting of glass, ceramics, mineral fibers, calcium silicate, diatomaceous earth, silica fireclay, high alumina diaspore clays, calcium aluminate, zirconia, magnesite, dolomite, forsterite, chromium ores, berylia, thoria, rare earth metal oxides, and mixtures thereof.

36. The process of claim 29, wherein said first and second insulating materials are selected from the group consisting of oxides of aluminum, boron, cobalt, chromium, nickel, magnesium, manganese, phosphorous, silicon, zirconium, rare earth metals, and mixtures thereof.

37. The process of claim 29, said furnace is selected from the group consisting of AC electric arc furnace, DC electric arc furnace, plasma arc furnace, AC submerged arc furnace, and DC submerged arc furnace.

38. The process of claim 29, wherein said charge comprises a carbonaceous reducing agent and at least one component selected from the group consisting of aluminum, aluminum oxide, steel, iron, iron oxide, copper, copper oxide, magnesium, magnesium oxide, manganese, manganese oxide, chromium, chromium oxide, rare earth metal oxides, and mixtures thereof.

39. The process of claim 29, wherein said insulating material is applied to first and second electrode cores by gluing, wrapping, clamping, casting, painting, dipping or spraying.

40. The process of claim 29, wherein said charge comprises a carbonaceous reducing agent and at least one component selected from the group consisting of iron ore, mill scale, direct reduced iron, hot briquetted iron, scrap iron and scrap steel, and wherein said molten metal is foundry iron.

41. The process of claim 40, wherein said charge comprises scrap iron or steel; and said process further comprises melting the scrap iron or steel and producing foundry iron having a carbon content of about 0.01 percent to about 4.5 percent by weight.

42. The process of claim 40, wherein said charge comprises scrap iron or steel; and said process comprises melting the scrap iron or steel and producing foundry iron having a silicon content of about 0.05 percent to about 9.5 percent by weight.

43. The process of claim 40, wherein said charge further comprises substantially pure quartzite or sand.

44. The process of claim 40, wherein the carbonaceous reducing agent is selected from the group consisting of wood chips, char, charcoal, coal, petroleum coke, bituminous coke and mixtures thereof.

45. The process of claim 29, wherein said charge comprises aluminum, copper, magnesium, manganese, chromium, nickel, zinc, lead, gold, silver, and alloys thereof.

46. The electric furnace of claim 20, wherein said furnace is a submerged arc furnace.

47. The process of claim 29, wherein said furnace is a submerged arc furnace.

* * * * *